US008291543B2

(12) United States Patent
McCoy et al.

(10) Patent No.: US 8,291,543 B2
(45) Date of Patent: Oct. 23, 2012

(54) ADAPTER APPARATUS FOR COLLECTING DEBRIS AND RELATED METHOD

(76) Inventors: Timothy R. McCoy, Discovery Bay, CA (US); Jesse R. Davison, San Francisco, CA (US)

( * ) Notice: Subject to any disclaimer, the term of this patent is extended or adjusted under 35 U.S.C. 154(b) by 0 days.

(21) Appl. No.: 13/085,797

(22) Filed: Apr. 13, 2011

(65) Prior Publication Data

US 2011/0283474 A1    Nov. 24, 2011

Related U.S. Application Data

(60) Provisional application No. 61/396,072, filed on May 21, 2010.

(51) Int. Cl.
*A47L 13/52* (2006.01)
(52) U.S. Cl. ...... 15/257.1; 15/257.4; 220/694; 220/700; 220/908.3; D32/74
(58) Field of Classification Search ............... 15/257.1, 15/257.9, 257.4; 220/695, 696, 697, 698, 220/699, 700, 701, 702, 729, 731, 908.3, 220/911, 4.03, 694, 379; 141/108, 109; D32/74
See application file for complete search history.

(56) References Cited

U.S. PATENT DOCUMENTS

| | | | | |
|---|---|---|---|---|
| 2,420,487 A * | 5/1947 | Long | | 222/570 |
| 2,720,346 A * | 10/1955 | Compton | | 222/570 |
| 2,767,891 A * | 10/1956 | Beadles | | 222/570 |
| 3,972,453 A * | 8/1976 | Kapples | | 222/530 |
| 4,312,531 A * | 1/1982 | Cross | | 248/99 |
| 4,583,666 A * | 4/1986 | Buck | | 222/109 |
| 4,795,046 A * | 1/1989 | Rath | | 220/694 |
| 4,802,258 A * | 2/1989 | Jensen | | 15/257.1 |
| 4,907,714 A * | 3/1990 | Gatz | | 222/570 |
| 5,195,662 A * | 3/1993 | Neff | | 222/108 |
| 6,915,921 B2 * | 7/2005 | Mensch | | 220/212 |
| 6,974,167 B2 * | 12/2005 | Springs, II | | 294/214 |
| 6,983,965 B1 * | 1/2006 | Bergell | | 294/214 |
| 7,025,733 B2 * | 4/2006 | McQuaid | | 600/573 |
| 7,665,494 B2 * | 2/2010 | Kulas | | 141/365 |
| 7,665,626 B2 * | 2/2010 | Alvares | | 220/379 |
| 7,784,145 B1 * | 8/2010 | Prokop | | 15/257.06 |

* cited by examiner

*Primary Examiner* — Mark Spisich
*Assistant Examiner* — Michael Jennings
(74) *Attorney, Agent, or Firm* — Girard & Equitz LLP

(57) ABSTRACT

An adapter apparatus to be installed on a pail to allow debris to be swept into the pail when the pail is resting on its side on a surface to be swept. A mounting section is included which is configured to be positioned over at least part of a lip of the pail and secured in place on the pail. A debris collector guide is attached to the mounting section, with the debris collector guide including a pair of sidewalls and a bottom section disposed intermediate the side walls, with the sidewalls and bottom section forming a debris collection region which permits debris to be swept into the debris section and into a pail on which the adapter apparatus is installed.

2 Claims, 4 Drawing Sheets

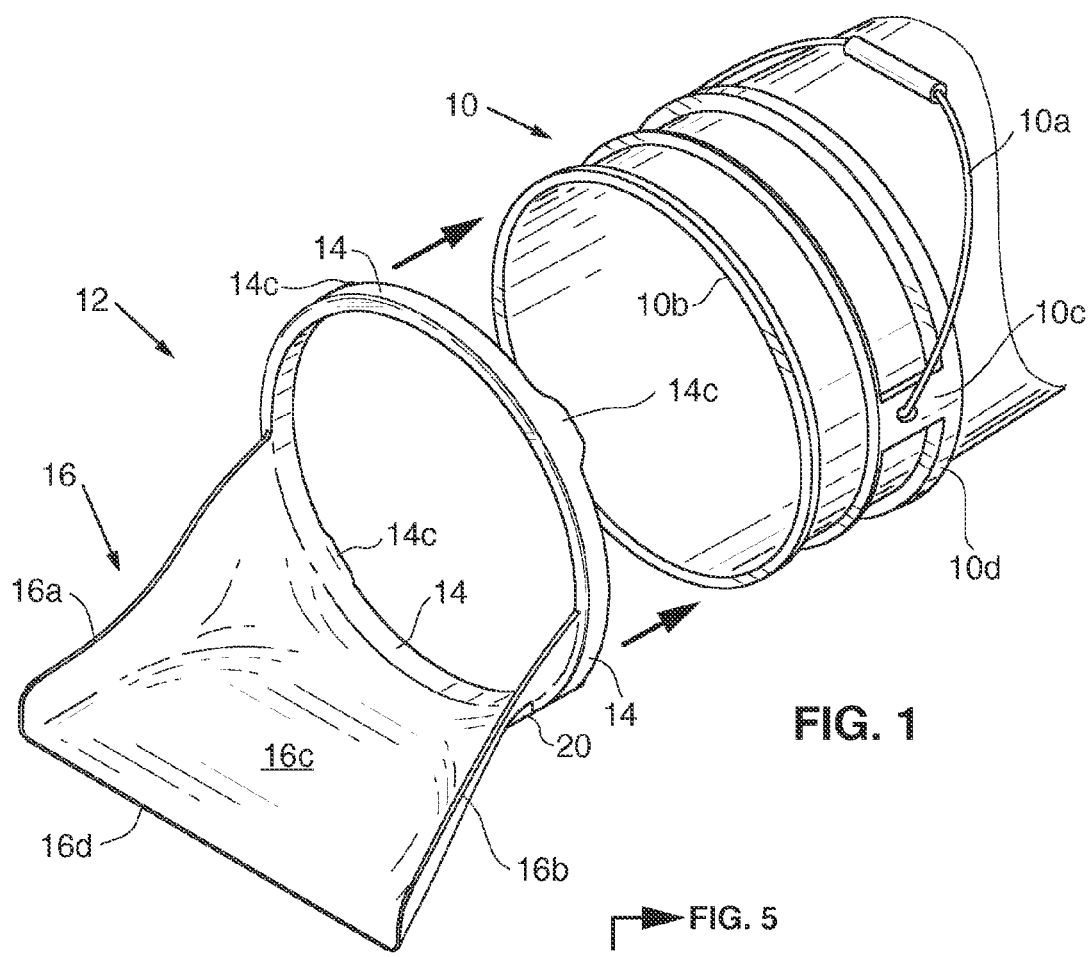
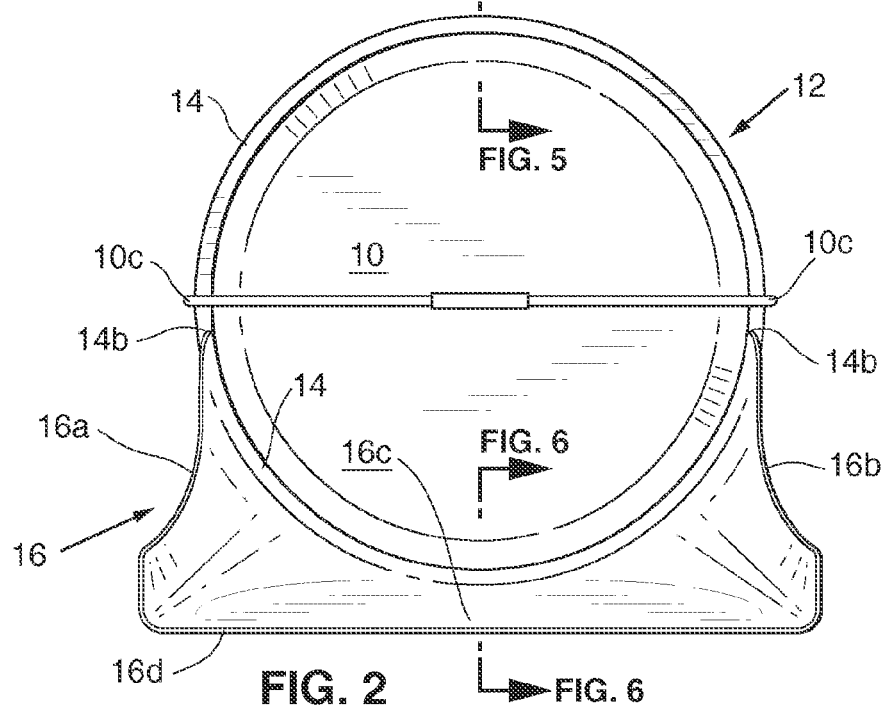

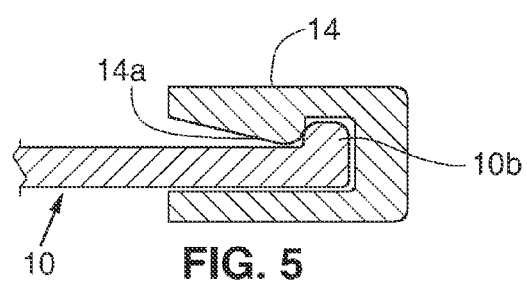
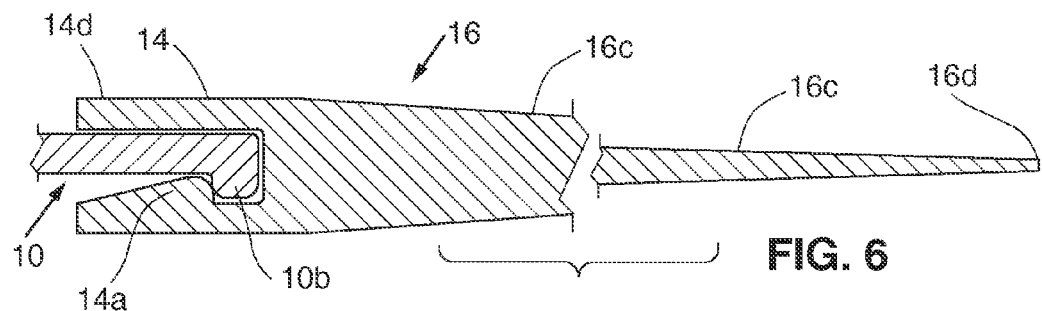
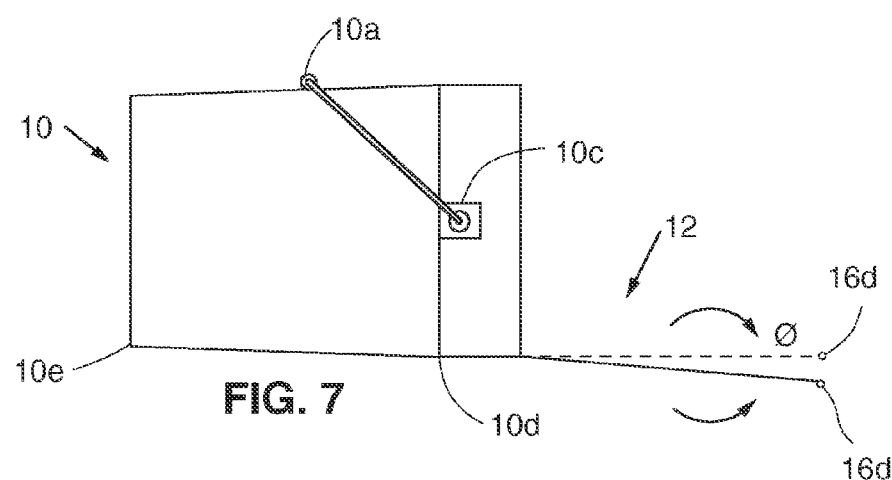
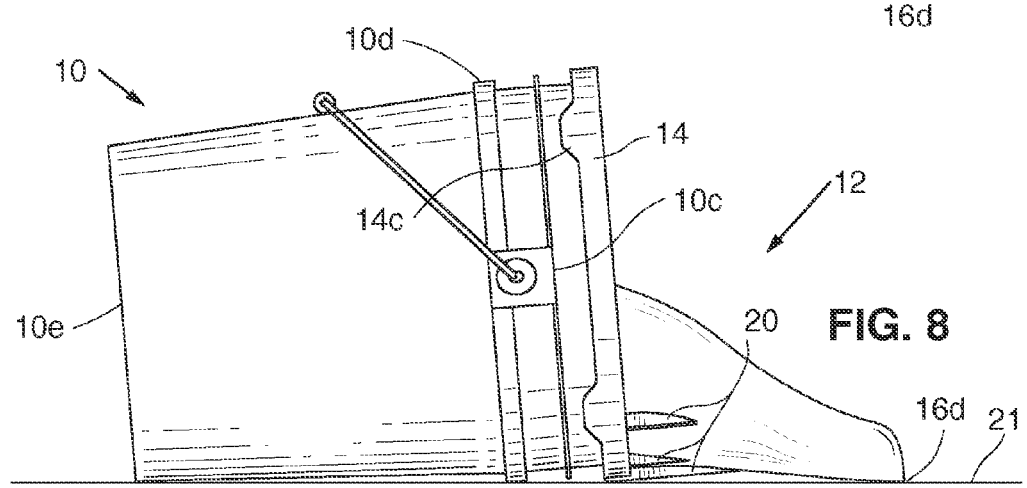

ADAPTER APPARATUS FOR COLLECTING DEBRIS AND RELATED METHOD

CROSS-REFERENCE TO RELATED APPLICATION

This application claims the benefit under 35 U.S.C 119(e) of U.S. Provisional Application No. 61/396,072 filed May 21, 2010.

BACKGROUND OF THE INVENTION

1. Field of the Invention

The present invention relates generally to the art of debris collection and more particularly to an adapter apparatus which can be temporally attached to a conventional pail so that the debris can be swept into the pail and then carried away in the pail using the pail handle.

2. Summary of the Invention

An adapter apparatus is disclosed which is to be installed on a pail to allow debris to be swept into the pail when the pail is resting on its side on a surface to be swept. The apparatus includes a mounting section configured to be positioned over at least part of a lip of the pail and secured in place on the pail. A debris collector guide is attached to the mounting section, with the debris collector guide including a leading edge located at an end of the debris collector guide opposite an end connected to the mounting section and a curved cross-section along a plane parallel go the mounting section, with the plane being disposed intermediate the mounting section and the leading edge. The collector guide forms a debris collection region which permits debris to be swept past the leading edge and into a pail installed on the adapter apparatus.

In one embodiment the mounting section extends completely around the lip of the pail when installed on the pail and in another embodiment the mounting section extends only partly around the lip.

BRIEF DESCRIPTION OF THE DRAWINGS

FIG. 1 is a perspective view of one embodiment of the adapter apparatus showing the apparatus being attached to a conventional pail to form a debris collection assembly.

FIG. 2 is an elevational front view of the subject adapter apparatus of FIG. 1 attached to a conventional pail (the pail handle would normally be positioned as depicted in FIG. 1 but is shown here in a horizontal position for purposes of illustrating the position of the adapter apparatus relative to the pail).

FIG. 5 is a cross-sectional view of the subject adapter apparatus attached to a pail taken through section line 5-5 of FIG. 2.

FIG. 6 is a cross-sectional view of the subject adapter apparatus attached to a pail taken through section line 6-6 of FIG. 2.

FIG. 7 is a schematic view of the variations of the angle of the adapter apparatus with respect to the side wall of a pail to which the apparatus is attached.

FIG. 8 is a side view of the adapter apparatus installed on the pail, with the combination resting on a surface to be swept.

DETAILED DESCRIPTION OF THE INVENTION

Figure 3:
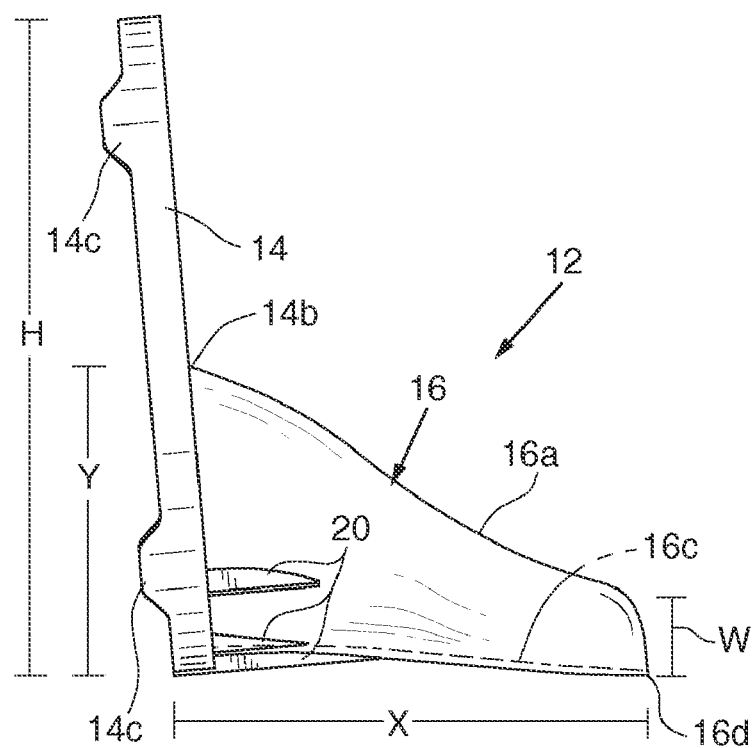
FIG. 3 is an elevational side view of the subject adapter apparatus of FIG. 1 separated from the pail.

Referring to the drawings, FIG. 1 shows a perspective view of one embodiment of the subject adapter apparatus generally designated by the numeral 12. Apparatus 12 is depicted being installed on a conventional plastic pail, generally designated by the numeral 10, to form a debris collection assembly. Pail 10, sometimes referred to as a bucket, is typically formed from injection molded plastic. One source of such plastic pails is the Argee Corporation of Santee, Calif. which produces a line of pails including pails having various capacities of 2, 3.5 and 5 gallons. Any one of these capacities can be used in combination with the subject adapter apparatus to form a debris collection assembly. The 5 gallon pail, which is marketed by the Argee Corporation under the designation RG5590 has a diameter of approximately 12 inches and a height of approximately 14.5 inches.

Assuming, by way of example, that pail 10 has a capacity of 5 gallons, the pail is provided with an annular attachment member 10b on the upper rim or lip which normally functions to grip a lid which can be used in connection with the pail. Annular attachment member 10b, which is depicted in FIGS. 5 and 6, has a diameter of approximately 12 inches. Pail 10 is provided with two or more annular outward extending reinforcing rings, such as ring 10d of FIG. 1 which reduce lateral deflection of the relatively thin side walls of the pail and which provide additional support for two opposite handle anchor members 10c. Anchor members 10c provide support the wire handle 10a of the pail.

The adapter apparatus 12, which is preferably formed from injected plastic, includes a collector guide, generally designated by the numeral 16 and an associated annular mounting ring 14. As will be described, mounting ring 14 is configured to temporarily attach to the pail 10 by engaging the annular member 10b similar to the manner in which the conventional plastic lids are secured to the pail. Once the adapter apparatus 12 has been installed on pail 10, the pail is positioned on what is usually a horizontal surface which is to be swept clear of debris as shown in schematically in FIG. 7 and also shown in FIG. 8. Preferably, the pail 10 is largely self-supporting on the surface even after the adapter 12 has been installed. Such support is typically provided near the pail bottom located at the end 10e of the pail and at one of the outward extending reinforcing annular rings 10D of the pail.

As can best be seen in FIG. 3, gussets 20 can be provided which extend from the collector guide 16 to the attachment ring 14 to provide increased strength in this region and to also allow lighter weight construction. In the present embodiment, five gussets 20 are used including a relatively long central gusset flanked on both sides by two shorter gussets.

As shown in FIG. 7, the geometry of a typical pail 10 is such that the pail tends to be disposed at an angle with respect to the support surface. For relatively short pails (thus smaller capacity), the distance between locations 10d and 10e is relatively small so that the pail tends to be angled upwards at a relatively large angle. Conversely, for the longer pails (thus larger capacity), the distance between these locations is relatively large so that the pail is disposed at a smaller angle relative to the support surface. To compensate for these varying angles, the geometry of the adapter apparatus 12 is selected so that a leading edge 16d (to be described in connection with FIG. 2) of the collection guide 16 extends down at an angle ø with respect to the sidewall of the pail 10 such that the leading edge engages the support surface. The value of angle ø can typically vary from 0 to 15 degrees depending on the pail dimensions.

The adapter apparatus 12 can be configured so that it bears substantially none of the weight of pail 10 and its debris load. Thus, when the pail is filled with heavy debris such as construction material, the adapter apparatus 12 need not carry a heavy load. Depending upon the geometry of the various components, it is also possible that the lower portion of attachment ring 14 will contact the support surface and provide some support but will not place any substantial stress of the collector guide 16. Thus, the collector guide 16 can be fabricated of light weight (hence low cost) materials. Further, support can also be provided by one or more of the gussets 20 which can extend slightly past the edge of ring 14 as shown in FIG. 8 to contact the supporting surface 21.

As previously noted, the geometry of adapter apparatus 12 is such that when the pail 10 it is installed on a substantially horizontal surface, the leading edge 16d of the collector guide contacts the surface so that debris can be swept onto (and not under) a bottom section 16c to be described and so that rotation of the pail 10 about the major axis of the pail is prevented.

As can be seen in FIGS. 1, 2 and 3, collector guide 16 includes opposite curved sidewall members 16a and 16b and an intermediate bottom member 16c which together define a generally concave surface. This surface forms a debris collection and guide region. That part of the collector guide 16 where debris in introduced into the guide forms a relatively wide mouth where bottom section 16c terminates in a leading edge 16d. The bottom section 16c of the collector guide 16 narrows in width in the region proximate the attachment ring 14 so that debris introduced at the mouth is funneled into this narrower region to allow debris to be easily swept into the pail 10. As can be seen in FIG. 6, the lower, inner portion of ring 14, portion 14d, or the bottom section 16c near portion 14d can be raised somewhat above the lower pail 10 so as to provide a shallow barrier so that gravity will tend to prevent debris from exiting the pail. The debris can then be easily removed by detaching the adaptor apparatus 12 or by leaving the adaptor in place.

FIG. 5 is a cross-section of the attachment ring 14 taken at section line 5-5 of FIG. 2. When the adapter apparatus 12 is to be installed on a pail 10, the handle 10a is rotated away from the center opening of the pail as shown in FIG. 1 so that it rests adjacent the side wall of the pail. Ring 14 is positioned opposite the annular attachment member 10b of the pail so that when the two components are forced together, member 10b deflects the circular locking member 14a out of the way. Once member 10b is moved past member 14a, member 14a then snaps back in place as shown in FIG. 5 to capture the attachment member 10b so as to lock the pail 10 and ring 14 in place. Similarly, FIG. 6 is a cross-section of the attachment ring 14 located in the region of the collector guide 16. Again, the ring 14 is positioned opposite the annular attachment member 10b of pail 10 so that when the two components are forced together member 10b deflects locking member 14a out of the way until member 10b passes member 14a so that member 14a snaps back in place as shown in FIG. 6.

As previously noted, the attaching mechanisms depicted in FIGS. 5 and 6 are somewhat similar to that used to secure a conventional lid to pail 10. However, since a conventional lid has a central portion connecting the outer rim together, the element corresponding to locking member 14a is more difficult to displace when the lid is installed and removed. Since the attachment ring 14 does not have a central portion connecting the interior of ring 14 together, the locking members are more easily displaced. Thus, much less force is required to install and remove the adaptor apparatus 12 on the pail, with this being advantageous in the present application. Table 1 below shows approximate dimensions in inches for the various features of an exemplary adapter apparatus 12 assuming a 5 gallon sized pail.

TABLE 1

Figure 4:
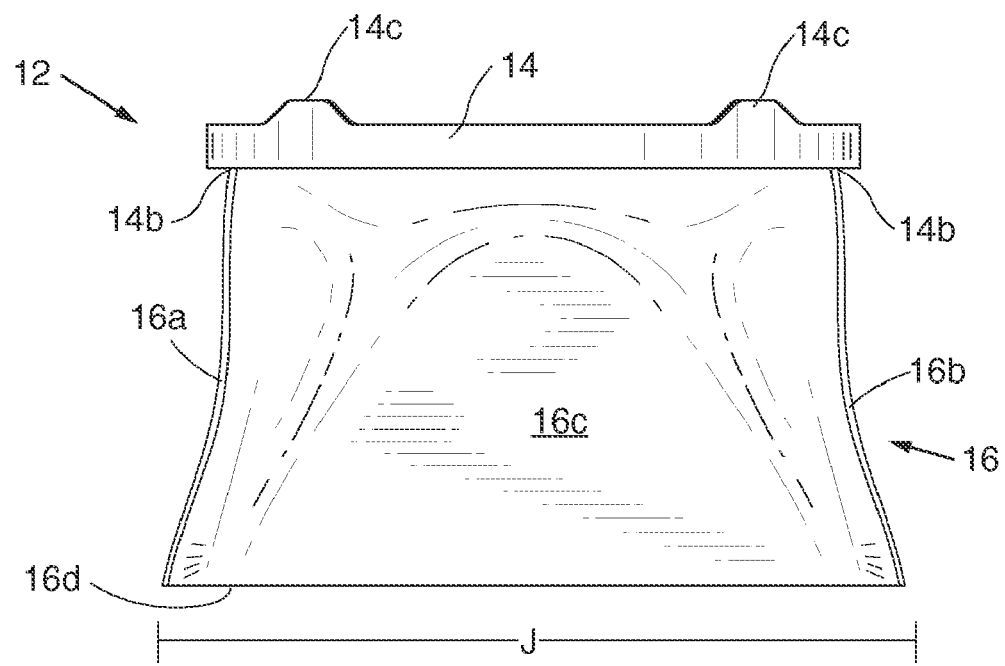
FIG. 4 is a plan view of the subject adapter apparatus of FIG. 1 separated from the pail.

| Height of side walls 16a/b near leading edge 16d. | W (FIG. 3) | 2 inches |
|---|---|---|
| Distance from edge of ring 14 to leading edge 16d. | X (FIG. 3) | 9 inches |
| Distance from bottom of ring 14 to the side wall 16a/b attachment points 14b. | Y (FIG. 3) | 6 inches |
| Diameter of ring 14. | H (FIG. 3) | 12 inches |
| Width of leading edge 16d. | J (FIG. 4) | 14 inches |

Having described the various features that make up the subject adapter apparatus 12, the manner in which the apparatus is used will now be described. First, the pail handle 10a is swung away from the pail opening as depicted in FIG. 1. The user then affixes the adapter apparatus 12 to the pail, preferably with the pail resting vertically. Ring 14 of the adapter apparatus 12 is positioned over the annular attachment member 10b of the pail 10 located at the lip of the pail, with the entire collector guide 16 being disposed between the handle attachment points 10c of the pail on the side of the pail opposite the side where the handle is resting. This arrangement, along with attachment point 14b dimension Y (FIG. 3) being no greater than one half the diameter of attachment ring 14, prevents the adapter apparatus 12 from interfering with the handle 10a when the handle is raised to a carrying position as shown in FIG. 2.

With the adapter apparatus 12 properly aligned with the vertical pail as just described, the apparatus 12 is forced down on the pail so that the attachment ring 14 is snapped in place over the annular attachment member 10b located at the lip of the pail as previously described in connection with FIGS. 5 and 6. This procedure can be carried out by initially forcing the ring 14 down on the pail at two opposite ring locations. Once these opposite sections are locked in place, two additional opposite locations are forced in place, with this continuing until the entire ring 14 is secured. The resultant debris collection assembly 10/12 is then placed on a substantially horizontal surface to be swept, with the handle 10a being repositioned as shown in FIG. 1. As previously described, the pail 10 rests horizontally on the surface, with at least the leading edge 16d of the collector guide 16 also resting on the surface. Debris is then swept into the pail by way of the collector guide 16. The pail 10 can be periodically moved to a vertical position so that the collected debris will fall to the pail bottom and then returned to the horizontal position for further debris collection. Once all of the debris for a particular area has been removed, the assembly 10/12 can be easily transported to another location using only handle 10. Note that ring 14 is provided with spaced apart tabs 14C which can be gripped by a user to assist in removing the adapter apparatus from a pail.

Figure 9:
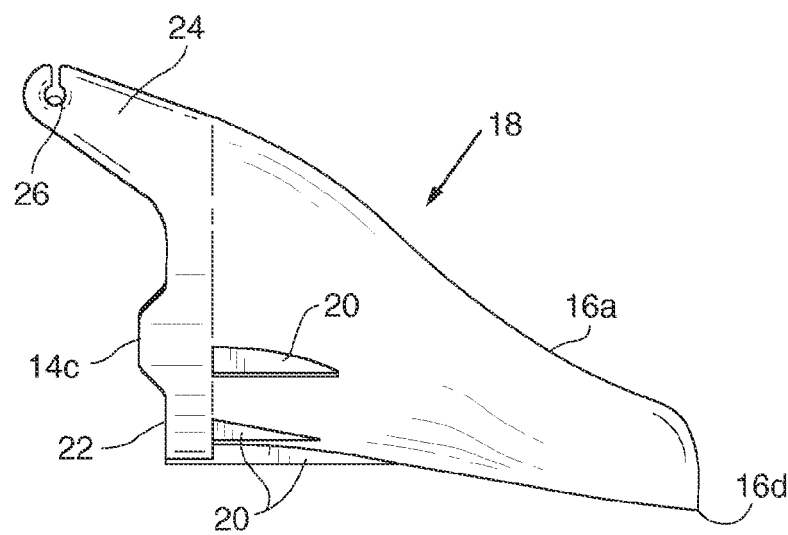
FIG. 9 is a side elevational view of a second embodiment adapter apparatus.
Figure 10:
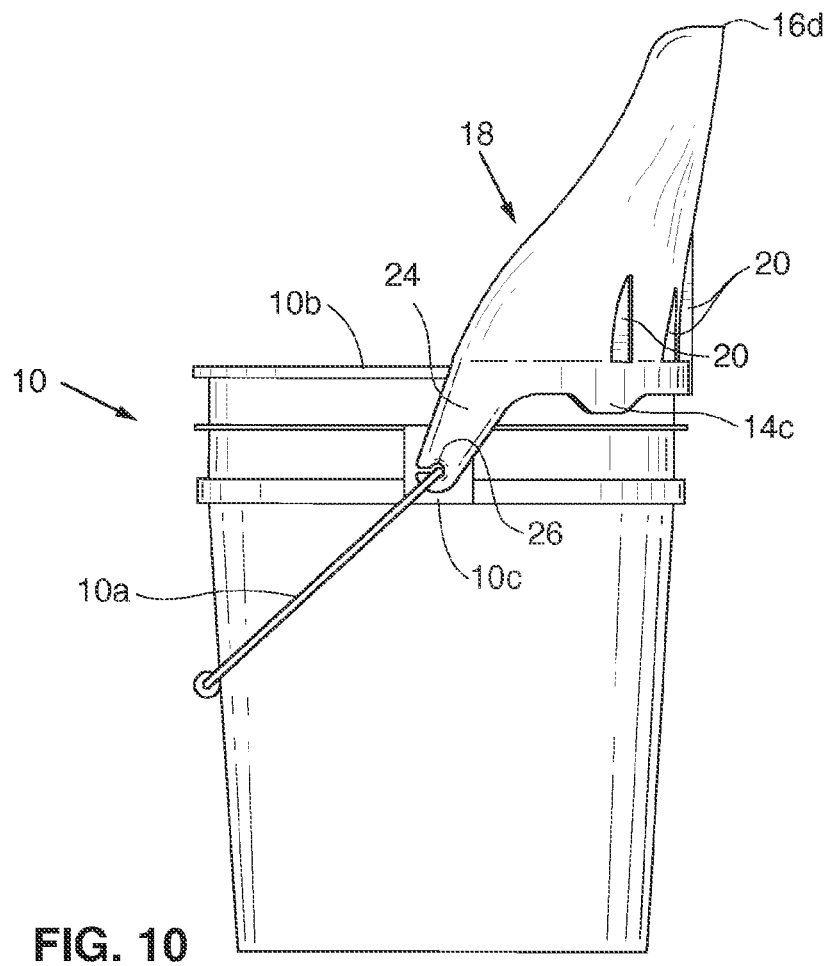
FIG. 10 shows the second embodiment adapter apparatus of FIG. 9 installed on a pail.

In the previously described embodiment, attachment ring 14 extends completely around the lip of pail 10 which includes the annular attachment member 10b. This approach provides ensures that the adapter apparatus is securely attached to the pail. Another embodiment 18 of the adapter apparatus is shown in FIG. 9 and attached to a pail in FIG. 10. (The collection guide 16 remains unchanged.) Instead of extending completely around the lip of the pail, embodiment includes a curved mounting section 22 which extends about half-way around the lip of pail 10. Although not shown in FIGS. 9 and 10, the interior portion of ring section 18 includes a member, similar to attachment member 10b (FIG. 5), which extends around the interior of mounting section 22 and engages about one-half the length of the attachment member 10b of the pail. Preferably, gussets 20 are again provided which strengthen the connection between the collector guide 16 and the mounting section 22. An advantage of second embodiment 18 is that the geometry of the entire adapter apparatus is more conducive to shipping since several of the individual apparatus can be nested within one another to create a more compact form factor for shipping.

Although mounting section 22 extends only half-way around the lip of pail 10, the attachment strength is usually more than adequate. However, to add further strength, ring section can be provided with a pair of attachment ears, including ear 24A, which extend away from the ring section and engage the pail handle 10c at opposite sides of the pail. Each ear 24A is preferably made of the same plastic as the remainder of the collector guide 16 is provided with a notched opening 26. Openings 26 can be forced over the wire handle 10a in the region of the handle which extends into the two handle attachment points or anchor members 10c of the pail. The portions of the pail handle 10a extending into members 10c rotate about a horizontal axis so that the handle can be lifted from the position shown in FIG. 8B to a vertical position with the attachment ears 24 in place to permit the pail to be lifted for transporting the pail. The ends of the two ears 24 are relatively thin so that they can be inserted between the handle 10a and the anchor members 10c without interfering with the pivoting of the handle. The two notched openings 26 have a diameter slightly larger than the diameter of the handle, with the notches having a width that is slightly smaller than the handle diameter. Thus, the ears 24 can be snapped over the short horizontal sections of the handle 10a entering the anchor members 10c and thereby retained in place. When installing the adapter apparatus 18 on the pail 10, it is preferred that the curved mounting section 22 first be attached to the lip of the pail followed by snapping the two ears 24 in place over the handle 10a.

Although the subject invention has been described in terms of using an existing pail, it would be possible to fabricate a pail in combination with a collector guide 16 at the same time so that no attachment ring 14 is required. In other words, the guide 16 is no longer separate from the pail but rather the pail and guide form one permanent unit. In that event, the guide 16 portion and the pail 10 portion should be arranged so that the guide does not interfere with operation of the pail handle as described above. However, the previously described embodiment where the adapter apparatus 12 is configured to be added to and removed from an existing off-the shelf pail 10 is preferred.

Thus, various embodiments of an exemplary adapter apparatus to be used in combination with a separate pail for debris collection has been disclosed along with a method of using the adapter for debris collection.

What is claimed is:

1. An adapter apparatus to be installed on a pail to allow debris to be swept into the pail when the pail is resting on a side of the pail on a surface to be swept, said adapter apparatus including:
   a mounting mechanism configured to be positioned over at least part of a lip of the pail and secured in place on the pail, with the mounting mechanism being configured to extend only partway around the circumference of the lip of the pail, with the mounting mechanism including a pair of ear members disposed on opposite sides of the mounting mechanism, with the ear members being configured to be attached to opposite sides of a handle of the pail on which the adapter apparatus is installed and with the mounting mechanism ending at the respective ear members, and where the mounting mechanism further includes an attachment member movable between a normal position and a displaced position so that when the mounting mechanism is positioned over the lip of the pail, a protrusion on the pail near the lip functions to move the attachment member from the normal position to the displaced position and then towards a locking position where the protrusion is captured by the attachment member;
   a debris collector guide attached to the mounting mechanism, with the debris collector guide including a leading edge located at an end of the debris collector guide opposite an end connected to the mounting mechanism and a curved cross-section along a plane parallel go the mounting section, with the plane being disposed intermediate the mounting mechanism and the leading edge, with debris collector guide forming a debris collection region which permits debris to be swept past the leading edge and into a pail installed on the adapter apparatus.

2. The adapter apparatus of claim 1 wherein the leading edge contacts the surface to be swept when the debris collector guide is attached to the pail and the pail is resting on the side, with the geometry of the debris collecting guide, including the leading edge, operating to resist rotation of the pail.

\* \* \* \* \*